United States Patent [19]

Fernandes

[11] Patent Number: 4,771,867

[45] Date of Patent: Sep. 20, 1988

[54] CLAMP LOCK FOR MOTORIZED CHAIR

[76] Inventor: Elido A. Fernandes, 6754 Shoemake Ave., Modesto, Calif. 95351

[21] Appl. No.: 156,057

[22] Filed: Feb. 16, 1988

[51] Int. Cl.$^4$ ............................................. B60T 1/04
[52] U.S. Cl. ........................................ 188/32; 188/29
[58] Field of Search ................. 188/2 R, 2 F, 9, 19, 188/21, 22, 29, 32

[56] References Cited

U.S. PATENT DOCUMENTS

| | | | |
|---|---|---|---|
| 1,894,439 | 1/1933 | Chisholm | 188/32 |
| 2,738,034 | 3/1956 | Levine | 188/29 |
| 3,117,653 | 1/1964 | Altherr | 188/29 |
| 4,095,679 | 6/1978 | Walker | 188/32 |

FOREIGN PATENT DOCUMENTS

| | | | |
|---|---|---|---|
| 1121937 | 1/1962 | Fed. Rep. of Germany | 188/32 |
| 1139796 | 1/1969 | United Kingdom | 188/29 |

*Primary Examiner*—Duane A. Reger
*Attorney, Agent, or Firm*—Lothrop & West

[57] ABSTRACT

In order to immobilize the small rear wheels of a motorized chair during transit of the chair and occupant in a van or other conveyance, the chair is backed into the device and a lever is shifted by the occupant. The lever is connected to a linkage train including an overcenter toggle linkage and a pair of arcuate wheel clamping plates spaced apart to overlie the rear wheels. In one position of the lever, the plates clamp down on the wheels and lock the wheels in place. In the other position of the lever, the wheels are disengaged and allow the chair to move out.

8 Claims, 3 Drawing Sheets

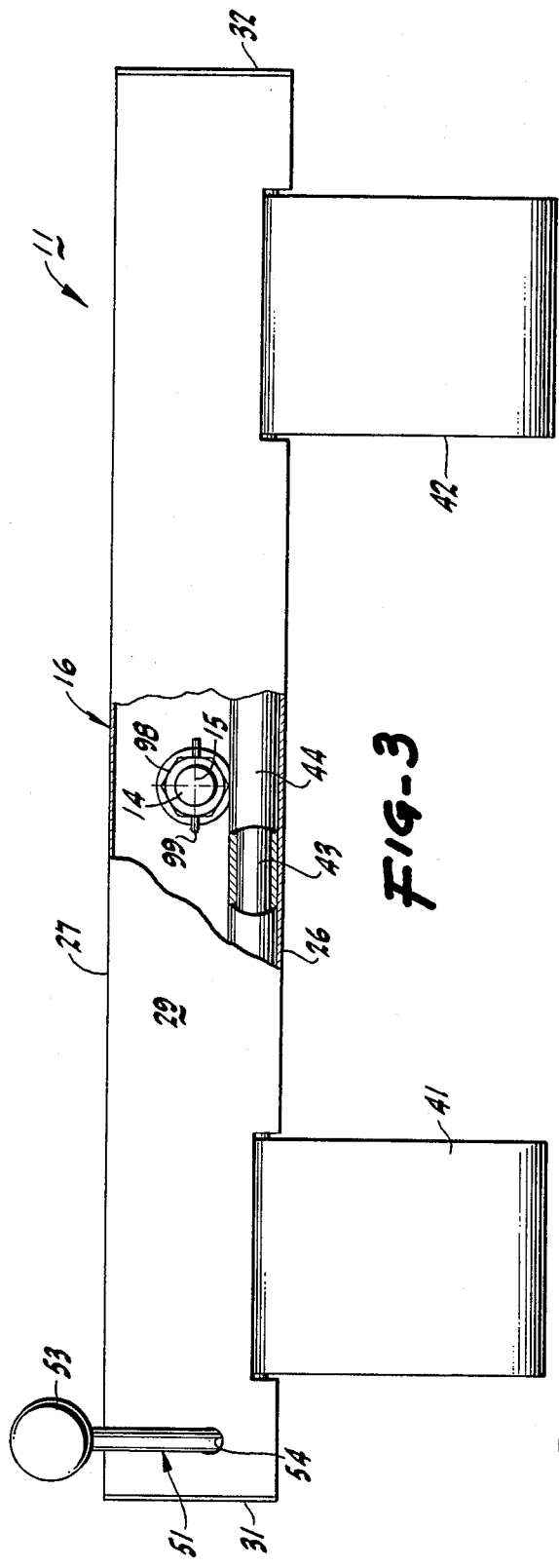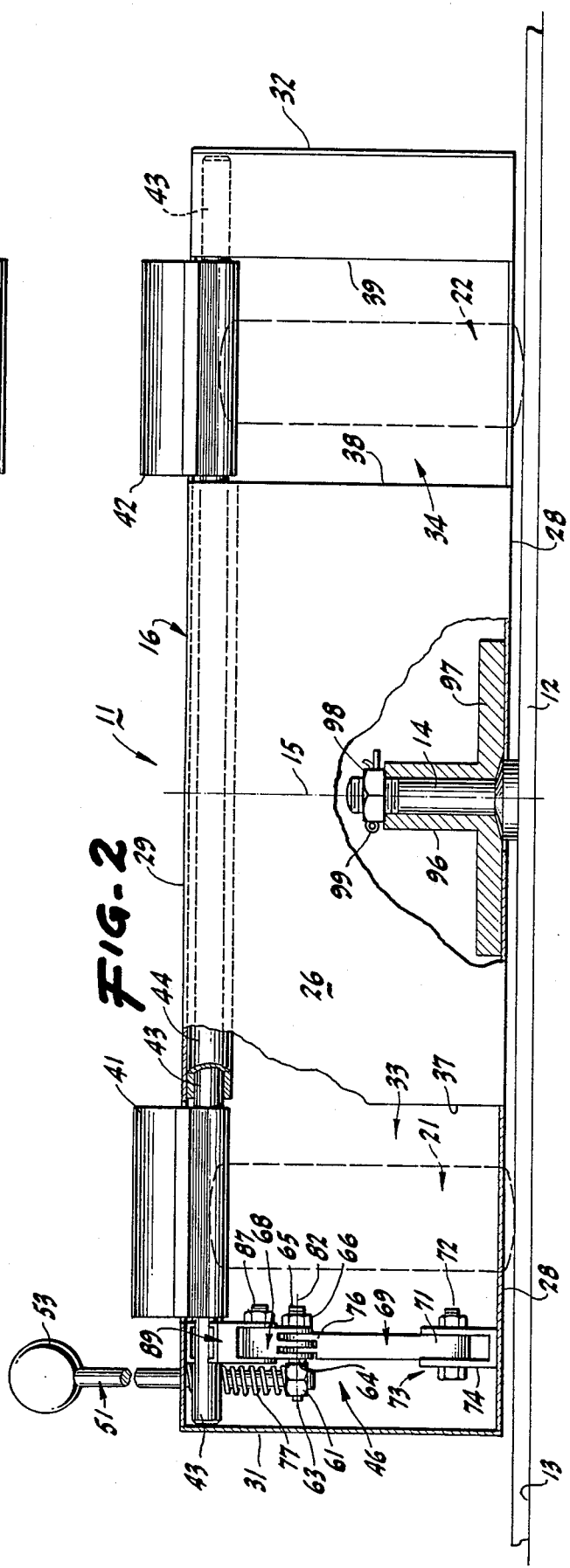

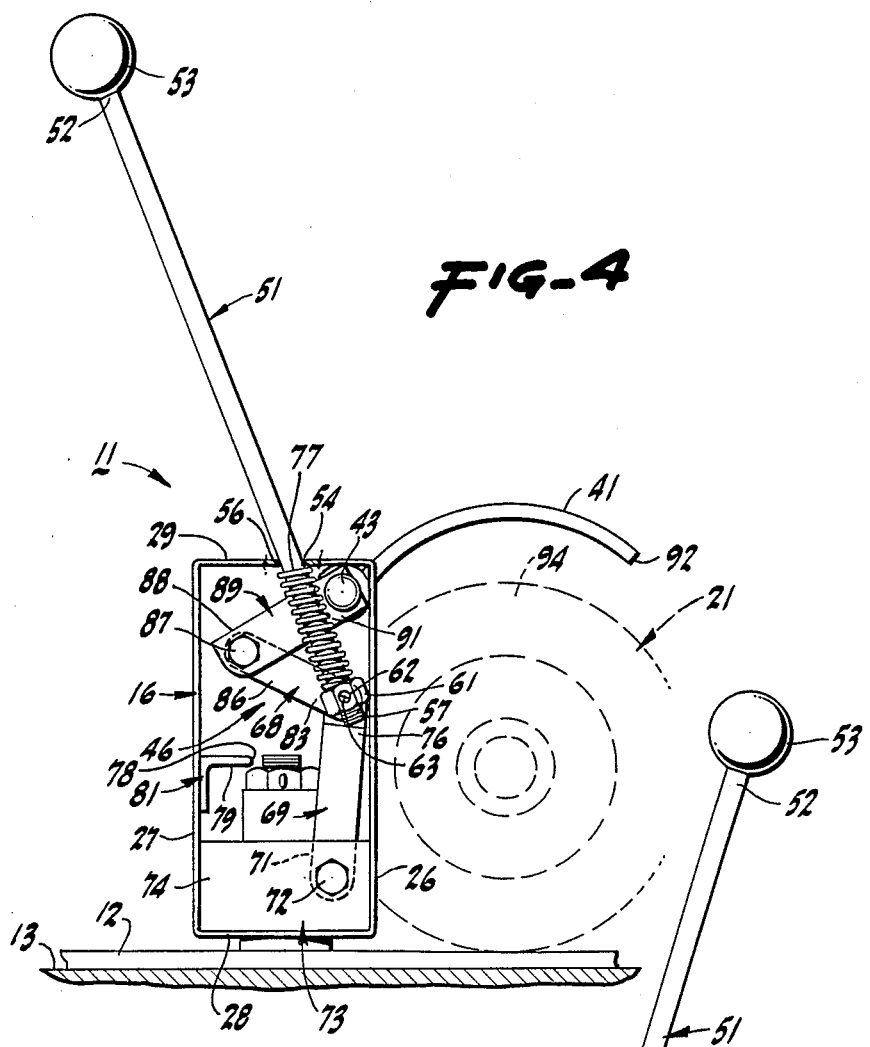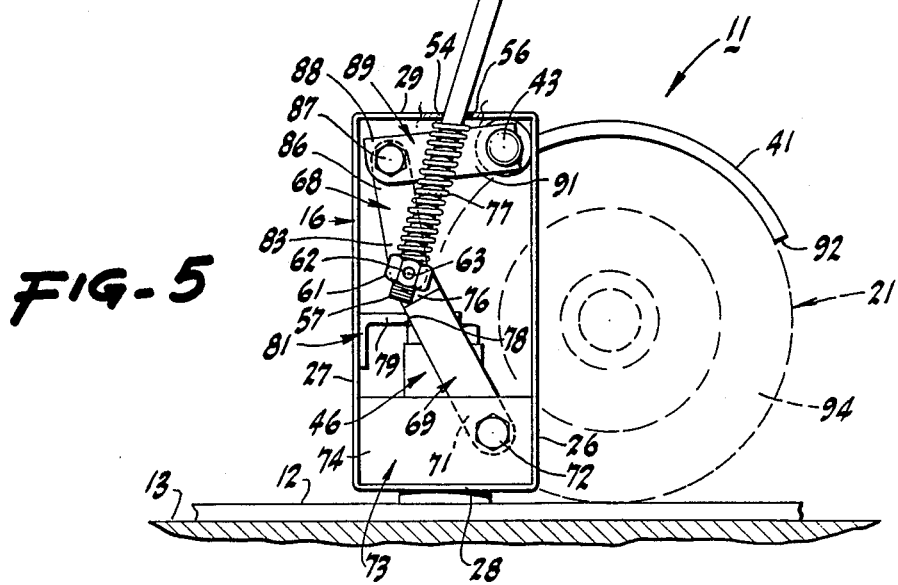

CLAMP LOCK FOR MOTORIZED CHAIR

BACKGROUND OF THE INVENTION

1. Field of the invention

The invention relates to devices for immobilizing motorized chairs during times when the chair and its occupant are being transported in a motor vehicle. The invention is especially concerned with devices capable of clamping motorized chairs of the type having two relatively small rear wheels and a single forward steering wheel, as contrasted with chairs having a rear pair of large wheels on opposite sides of the chair and a forward pair of small stabilizing wheels.

2. Prior Art

A search turned up the following U.S. Pat. Nos.:

| | | | |
|---|---|---|---|
| Seeley | 1,753,838 | Nelson | 4,093,303 |
| Barclay | 1,835,840 | Seay, et al. | 4,246,984 |
| Barclay | 2,101,210 | Howard | 4,588,340 |
| Tullock | 4,083,594 | | |

Seeley was cited for its disclosure of an overcenter linkage interconnecting a floor, or base, plate with the axle of a vehicle contained within a freight car in order to compress the vehicle's springs and enhance the immobilizing effect. While applicant's device includes an overcenter linkage, the respective linkages operate in different environments and the construction and operation of the Seeley's holddown is quite unlike that of applicant's claimed device.

Barclay '840 discloses means for locking a movable chair, having two relatively small rear-wheels, for transporting the chair in an automobile. This device involves a pair of guide rails for centering the chair, a feature which is essential for actuation of a hook-latch which engages a keeper installed on the chair. The structure and operation is at substantial variance from applicant's claimed clamp lock concept even though the objects of the two inventions are similar.

Barclay '210 offers a latching arrangement in which a U-shaped latch is snapped downwardly by a spring. This element and associated structure bear little resemblance to applicant's claimed device except that both devices relate to locking moveable chairs having a relatively small pair of rear wheels.

Tullock discloses means for holding large-wheeled wheel chairs in a motor vehicle; and is directed toward devices which are adjustable to compensate for variations in the lateral distance between the larger wheels of conventional wheel chairs. It bears but little resemblance to applicant's claimed device.

Nelson illustrates apparatus for retaining wheelchairs in a bus type motor vehicle; but, as in Tullock, the wheels are of the large type and the operation is dependent upon the force exerted by retaining arms and jaws on the chair's frame in urging the tires of the wheelchair against a fixed part of the bus frame or body. Applicant's claimed device is devoid of arms which embrace the wheelchair and, instead, restrains the small wheels of a small-wheeled chair by a combined frictional and positive interference effect.

Seay, et al. shows a safety apparatus that holds an occupied wheelchair in place as it is being transported in a motorized vehicle, such as a van. FIG. 4 and the accompanying description in Seay, et al. specifically disclose an apparatus for restraining the movement of chair wheels which are approximately six inches in diameter, such as those typically mounted on a motorized wheelchair, i.e. the kind of motorized chair with which the present application is concerned. Seay, et al., however, utilizes a yoke which is vertically slidable on an adjacent shaft, and the opening in the yoke captures a portion of the wheel. The construction and operation of the Seay, et al. apparatus is decidedly different from applicant's claimed device.

Howard discloses a method and apparatus for securing conventional (large wheel) and small-wheel, carriage-type (motorized) wheelchairs. In Howard, the "wheel locking component includes locking elements which extend through the spokes of the wheels of the wheelchair . . . preventing rotation of the wheels about their horizontal axis and/or rotational movement of the wheels about vertical axis." Howard also utilizes a handle-locking component. Howard's disclosure, in short, is at marked variance from applicant's claimed device.

SUMMARY OF THE INVENTION

It is a major object of the invention to provide a relatively small and economical device for safely, conveniently and reliably restraining an occupied motorized wheelchair provided with a pair of small rear wheels during transit in a motor vehicle, boat, aircraft or other conveyance.

The apparatus of the invention includes, in a preferred embodiment, a housing mounted on a base plate secured to the floor of a motor vehicle, such as a van, adjacent the wall opposite the entry/exit door of the wheelchair compartment. The housing is elongated tranversely to the path of the chair in order to span the distance between the two small rear wheels of the chair. The housing includes two apertures in a front wall each adapted to receive a portion of the respective rear wheel when the chair is in "parked" position. Two arcuate plates in register with the two apertures are clamped down onto the tops of the respective rear wheels when the apparatus is in "parked" or locked, or chair-restraining condition. To release the chair, the arcuate plates are pivoted upwardly to clear the tops of the wheels. A pivoted lever, readily accessible to the occupant, acts through a linkage train, including an overcenter toggle, to actuate the clamping plates and lock them when they are in chair-immobilizing condition. By pivoting the entire housing for movement about a vertical axis, the device can be made self-aligning as it confronts the approaching rear wheels when the chair is being backed into the device.

A safety belt can be used to advantage to help secure the occupant in the chair during transit.

BRIEF DESCRIPTION OF THE DRAWING FIGURES

FIG. 2 is a front elevational view thereof, with portions broken away to disclose interior details;

FIG. 3 is a top plan view thereof;

Figure 1:
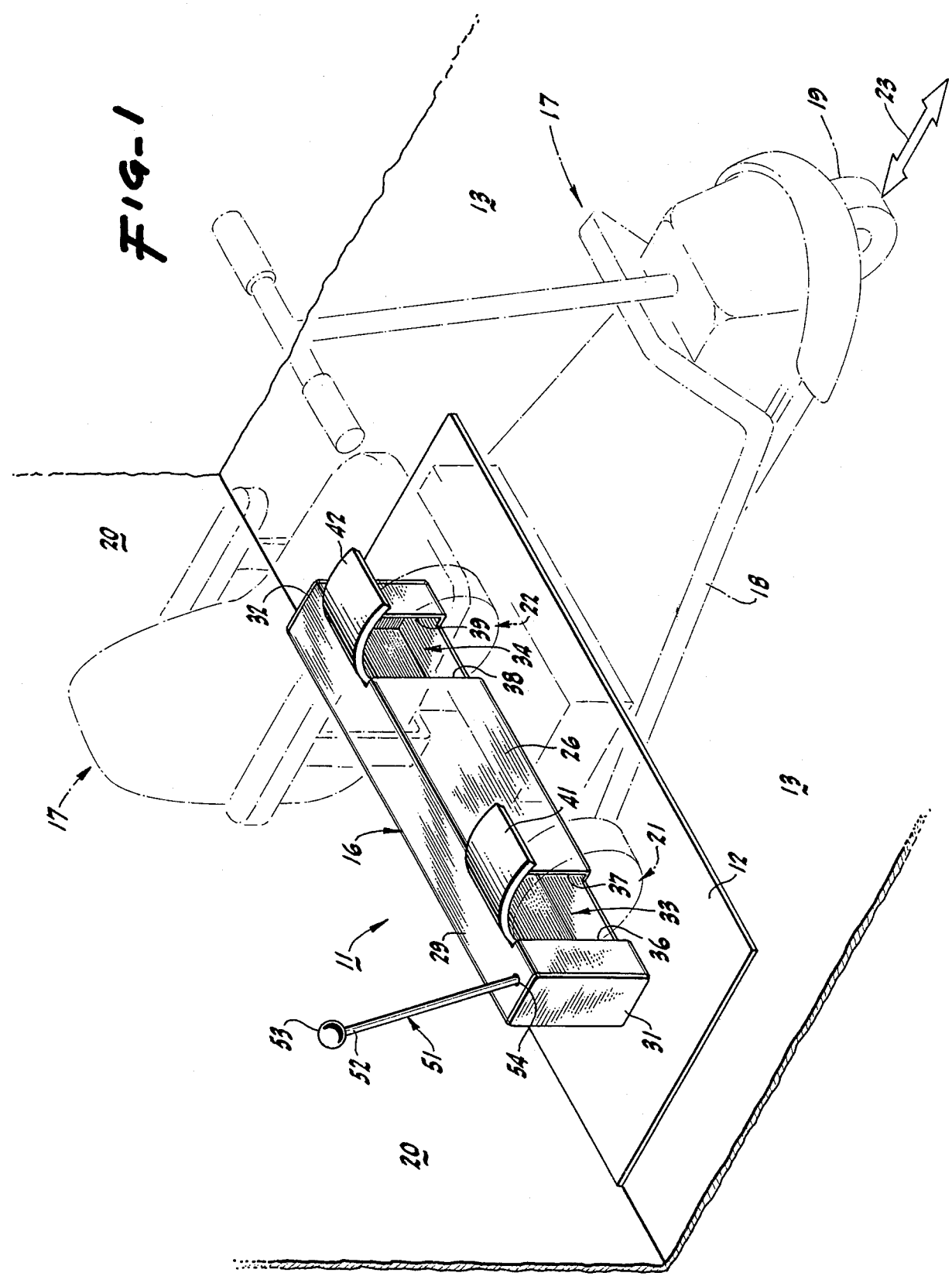
FIG. 1 is a perspective view of a preferred embodiment of the device, illustrating in broken line a typical motorized chair of the small rear wheel type, preparatory to being secured in the device.

FIG. 4 is an end view thereof with the end wall removed, showing the actuating lever and linkage train located in this instance at the left-hand end of the housing as it appears in FIG. 2 (for a chair occupant who relies upon the right hand and right arm to operate the lever), and with the clamping plates, the lever and the linkage in unclamped position; and, FIG. 5 is a view similar to that of FIG. 4, but with the clamping plates, the lever and the linkage in clamped position, and with the clamped chair wheel shown in broken line.

DETAILED DESCRIPTION OF A PREFERRED EMBODIMENT

In the following description, a van is recited as a convenient transit vehicle. It is to be noted, however, that other conveyances, such as recreational vehicles, motor homes, buses, boats and aircraft, can utilize the present device to advantage. Variations in installational details can also be made, depending upon the environment and requirements of use.

Although not limited to use in a van, an embodiment of the present invention has been installed, tested and successfully used in the main compartment of a vehicle of the van category. The van includes, in customary fashion, a sliding door on the right-hand side of the vehicle, the door providing convenient entry and egress for a mobilized chair and its occupant.

Opposite the entry/exit door of the van, the device of the invention, generally designated by the reference numeral 11, is installed. The chair is preferably backed into the device in order to place the chair in clamping position. Thus, if the chair and occupant enter the van door with the back of the chair toward the opposite wall of the van, the path to the device 11 is straight and direct.

For strength, a base plate 12, or floor plate, is sturdily secured to the floor 13 of the van at a location adjacent the base of the wall 20 opposite the entry/exit door.

Mounted on the base plate 12 is a vertical pivot pin 14 on which the main housing 16 of the device is pivotally mounted. As will subsequently be explained in more detail, this pivoting feature is of particular help to an occupant who is perhaps not too skilled in guiding the chair backwardly to engage the device in proper manner. In other words, by being able to pivot the housing for limited rotation, in either direction, about a vertical axis, the device is made self-aligning. Thus if one of the rear wheels backs up and engages the device before the other wheel reaches the device, the backing force exerted by the first wheel will rotate the entire housing in a direction such that the second wheel is promptly confronted by and can immediately engage the device. Thus, both wheels engage the device at substantially the same time.

The major components of the device are enclosed within the housing 16, both for the sake of esthetics as well as for increased safety and better protection from dust and moisture.

The housing 16 is elongated in a direction transverse to the path 23, or direction of movement of the motorized chair 17. The chair includes, in typical manner, a frame 18, front steering wheel 19 and pair of relatively small (e.g. six inches in diameter) rear wheels 21 and 22 separated by a predetermined distance which may vary, depending upon the brand, or model, of the motorized chair.

The housing 16 is long enough to span the distance between the rear wheels 21 and 22 with a few inches extra; and the housing in its preferred form includes a front wall 26, i.e. a wall facing toward the chair, an opposite rear wall 27, a bottom wall 28, a top wall 29, a left-hand end wall 31 (i.e. the end on the left when looking toward the device as it appears in FIGS. 1–3) and an opposite right-hand end wall 32.

In order to enhance security of the chair 17 when in parked, i.e. clamped, position, the rear wheels 21 and 22 partially protrude into the housing.

More specifically, the aftermost portion of both wheels pass through a pair of respective vertical apertures 33 and 34, or slots, in the front wall 26 of the housing 16. The vertical boundary walls, or edge walls 36 and 37 and 38 and 39 of the apertures 33 and 34, respectively, are spaced apart a sufficient distance as to accommodate the respective rear wheels 21 and 22 with some room to spare, thereby making it relatively easy for the occupant of the chair to back the wheels into their respective apertures, or slots, in the front wall 26. The apertures, or slots 33 and 34, are narrow enough, however, so that if, during transit of the van, or other conveyance, unusually rough roads or bumps are encountered or sudden starts or stops occur, lateral support is provided to the rear wheels as the sides of the partially enclosed wheels are brought into abutment with one or the other of the vertical edge walls 36–37 and 38–39 defining the vertical boundaries of the apertures 33 and 34, respectively.

Clamping of the chair's rear wheels 21 and 22 is effected by a respective pair of arcuate clamping plates 41 and 42. The bases of the clamping plates 41 and 42 are mounted on a shaft 43 journaled in a sleeve 44 extending substantially the entire length of the housing 16, the sleeve 44 being located in the upper, front corner of the housing, as appears most clearly in FIGS. 4 and 5, and secured thereto, as by weldments. The sleeve 44, and adjacent portions of the upper front corner of the housing 16, are interrupted, or cut away, to accommodate, with some clearance, the two clamping plates 41 and 42 and the upper end of an actuating link (see FIG. 2).

In order to move the clamping plates 41 and 42 between their two extreme positions, namely, between a first or fully open, or unclamped, position, shown in FIG. 4, and a second, or fully closed, or fully locked, or fully clamped, position shown in FIG. 5, a system, or train, of linkages, generally designated by the reference numeral 46, is provided.

The linkage train 46 can be installed at either end of the housing 16, depending upon the occupant's preference. In the arrangement shown and described herein, the linkage 46 is placed at the left-hand end, as appears in looking toward the device in FIG. 2. This is the location usually preferred by right-handed occupants who ordinarily would use their right hand and right arm in actuating the wheel clamping and locking structure.

For left-handed users, the placement of the linkage train 46 would customarily be on the end opposite to that shown and described herein.

It should also be noted that the dimensions of the clamp lock components can be varied to suit the size and physical capabilities of the wheelchair's occupant.

Owing to the configuration and ratios of sizes of the various components of the linkage train 46, as disclosed herein, even rather severely disabled people, who do not have the muscle control or coordination required to handle flexible straps and multi-latching devices, can, with minimal effort, securely and reliably immobilize their motorized chairs for transit in a motor vehicle.

As appears most clearly in FIGS. 4 and 5, the linkage train 46 includes an upwardly extending lever 51 carrying at its upper end 52 a ball 53, or other suitable handle, to be gripped by the occupant of the chair in actuating the linkage train 46 and thereby effect locking and unlocking of the device.

The lever 51 extends downwardly through an opening 54 in the top wall 29, the margins of the opening 54 providing a bearing point 56, or fulcrum, which establishes the lever 51 as being a lever of the first class, meaning that force exerted on the upper end 52 of the lever 51 in a forward direction (i.e. toward the chair) is accompanied by a force exerted by the lower end 57 of the lever 51 in a rearward direction.

In like manner, a force exerted on the ball 53 in a rearward direction is accompanied by a force exerted by the lower end 57 of the lever 51 in a forward direction.

The ratio of the distance between the ball 53 and the fulcrum point 56 and the distance between the fulcrum 56 and the lower end 57 of the lever 51 determines, of course, the relative input and output forces. By suitably adjusting the distance ratios, chair users having disabilities of widely varying characteristics can be accommodated.

As appears most clearly in FIGS. 2, 4 and 5, the lower end 57 of the lever 51 is threaded and carries a nut 61. Formed in the nut 61 and the lower end portion of the lever 51 is a registering opening 62 into which is driven a holding pin 63. The nut 61 also includes a threaded opening into which is screwed the threaded base of a rod 64 including a threaded outer end portion 65.

The stem portion of the rod 64 serves as a pivot pin for two links, namely, a middle link 68 and a lower link 69, or bottom link, the links being held in proper axial position on the rod 64 by a nut 66 engaging the threaded end portion 65.

The lower end 71 of the bottom link 69 is pivoted on a pin 72 secured in a base block 73 comprising a U-shaped channel 74 (see FIG. 2) extending between the front wall 26 and the rear wall 27 of the housing and supported on the bottom wall 28 thereof (see FIGS. 4 and 5).

The lower end portion 71 of the bottom link 69 is slidingly confined by the interior faces of the U-shaped channel 74 (see FIG. 2) and the bottom link 69 is thereby constrained to move in a fore and aft direction only.

Rocking, or oscillation, or reciprocation, of the bottom link 69 occurs in response to the movement of the rod 64 mounted at right angles on the nut 61 which, in turn, is secured to the lower end 57 of the lever 51.

In other words, since the upper end 76 of the bottom link 69 is journalled on the rod 64, as is shown most clearly in FIG. 2, the bottom link 69 moves back and forth in a fore and aft direction as the nut 61 on the bottom of the lever 51 moves.

Slack in the fore and aft movement of the lower portion of the lever 51 and the bottom link 69 pivotally mounted thereon is taken up by a helical spring 77 interposed between the nut 61 and the lower surface of the top wall 29, around the periphery of the lever opening 54.

The spring 77 urges the nut 61 and the lever 51 in a generally downward direction as well as in a forward direction as appears in the lever and bottom link posture shown in FIG. 4 or, in the alternative, in a downward and rearward direction, as shown in FIG. 5.

In other words, the spring 77 urges the nut 61 forwardly into abutment with the front wall 26 so long as the upper end 52 of the lever 51 is in rearmost position, as appears in FIG. 4. Where, however, as in FIG. 5, the upper end of the lever is in forwardmost position, the spring 77 urges the lower link 69 into abutment with the adjacent leading edge 78 of a shelf 79, or ledge extending forwardly from the top of a bracket 81 mounted on the back wall 27.

During the movement between the forwardmost position shown in FIG. 4 and aftermost position shown in FIG. 5, the horizontal axis 82 of the rod 64 passes over "center", i.e. over the axis of the lever 51 and the bottom link 69 when the lever and the bottom link are in alignment.

As will be obvious, when the lever and the bottom link are in alignment, the spring 77 is shortened and compressed to some extent; and some degree of force is therefore required to move the lever from either of the two extreme positions to "center" position. After "center" is passed, the spring 77 assists in urging the lever onwardly and slightly downwardly.

The foregoing structure and operation describes an overcenter toggle or overcenter linkage which, in combination with the additional elements of the linkage train 46, or linkage system, now to be described, forms a secure, reliable and convenient arrangement for clamping and restraining the rear wheels 21 and 22 of the motorized chair.

As is best shown in FIG. 2, the rod 64, having an axis 82, not only carries the upper end 76 of the bottom link 69, but also the lower end 83 of the middle link 68.

The middle link 68 extends, in turn, to an upper end 86 pivotally mounted, by a pin 87, to the lower end 88 of an upper link 89, or top link.

It is the movement of the upper link 89 which rotates the shaft 43 carrying the two arcuate wheel-clamping plates 41 and 42. In other words, the upper end 91 of the top link 89 is affixed to the shaft 43. Since the two arcuate clamping plates 41 and 42 are also secured to the shaft 43, movement of the upper link 89 causes the plates to move.

Thus, when the lever 51 and attendant linkage train 46 are in the positions shown in FIG. 4, the clamping plates 41 and 42 are in elevated, or open position. The distance between the forward tips 92 of the clamping plates 41 and 42 and the subjacent surface of the floor 13 is sufficient to allow clearance when the wheels 21 and 22 are move rearwardly toward the housing 16 into "parking" position; or forwardly away from the housing 16 after the clamping plates 41 and 42 have been opened to allow the chair to travel toward the exit door.

It is to be noted that the dimensions of the two apertures 33 and 34 in the front wall of the housing are selected so that when the rear wheels 21 and 22 extend into the interior of the housing the proper distance, the wheels encounter the bases of the respective clamping plates 41 and 42 (see FIGS. 2 and 5) and are halted from proceeeding rearwardly any farther. At this junction, the curvatures of the lower surfaces of the arcuate clamping plates 41 and 42 are substantially concentric with, the curvatures of the conjugate upper surfaces of the rubber tires 94 of the wheels. As a consequence, when the lever 51 is pushed forwardly, after the wheels have come to a stop, the clamping plates 41 and 42 pivot downwardly and press down on the tires in tightly locked condition. The surface to surface contact affords a frictional retention; and the elongated forward extension 92 of the plates provides a positive interference, or overhang, which captures the wheels and prevents their displacement from the contained, or immobilized position, shown most clearly in FIG. 5.

Reference to FIG. 5 discloses that the occupant of the chair need only back the rear wheels 21 and 22 into the respective apertures 33 and 34 until the wheels are positioned by the top boundaries 93 of the apertures. When the occupant of the chair senses this occurrence, the lever ball 53 is grasped by the occupant's right hand and pushed forwardly from the after extreme position shown in FIG. 4 to the forward and downward extreme position shown in FIG. 5.

This transfer of position of the lever 51 results in the following sequence: The lever 51 first shifts forwardly and abuts the forward margin 56, or bearing point, or fulcrum, of the lever opening 54 in the top wall 29. As the lever movement continues and the lever approaches "center", or alignment, with the bottom link 69, the spring 77 is compressed. As the lever passes beyond "center" the upper end 76 of the bottom link 69 is pivoted toward the rear until it abuts, and is stopped by, the inclined forward edge 78 of the shelf 79.

During the foregoing period, the linkage train 46 acts in the following manner: The bottom link 69 pivots in a counterclockwise direction, as viewed sequentially in FIGS. 4 and 5; the middle link 68 shifts so that the lower end 83 moves toward the left while the upper end 86 moves upwardly, carrying with it the pivot pin 87 and the lower end 88 of the top link 89. This causes the top link 89 and associated arcuate clamping plates 41 and 42 to rotate in a clockwise direction into frictional and positive clamping engagement with the subjacent conjugate surfaces of the elastomeric tires on the wheels 21 and 22. The over-center linkage arrangement locks the plates in clamped position, as previously explained.

The self-aligning feature of the housing 16 is attained by mounting the housing on a vertical pin 14 (see FIG. 2). The housing 16 can be journalled on the pin 14 in a variety of ways. One way is as shown, comprising a vertical sleeve 96 encompassing the vertical pin 14. The pin 14 extends upwardly from the fixed base plate 12. The sleeve 96 is mounted on a large horizontal flange 97 firmly secured to the bottom wall 28 of the housing 16. The annular upper end of the sleeve 96 is slidingly confined by a nut 98 positioned by a cotter pin 99 extending through the nut 98 and through the threaded upper end of the vertical pivot pin 14. Vertical movement of the housing 16 is thereby prevented.

As previously mentioned, the self-aligning feature is especially helpful to inexperienced or severely disabled occupants since it is not necessary to guide the chair so that the wheels enter the respective slots simultaneously. A leading wheel will, upon encountering the housing, rotate the entire housing in the appropriate direction so that the trailing wheel is promptly confronted by its respective slot so that both wheels are properly positioned in the slots when the clamping plates 41 and 42 are lowered into wheel clamping position.

Even though the chair possesses lateral stability against overturning as a result of the secure clamping and locking of both rear wheels, it is desirable that a safety belt be provided. Since such belts are well known, it is not necessary to show or describe them other than to say that each half of the belt could be anchored to the floor plate 12 on opposite sides of the chair. The two free ends of the belt can readily be buckled when the chair wheels have been clamped and locked by the overcenter linkage.

After the transit has been completed and the safety belt unbuckled, the occupant reaches down, grasps the ball-shaped handle 53 and pulls back on the lever 51. Through a sequence which is the reverse of that previously described, the clamping plates 41 and 42 are pivoted upwardly to and locked in the unclamped position shown in FIG. 4. The chair is then free to move out.

The occupant can at this point, actuate the chair's motor switch and move along the path 23 toward the exit door of the conveyance.

I claim:

1. Clamp lock for motorized chair having two relatively small rear wheels said clamp lock comprising:
    a. a housing spanning the two rear wheels and including at least a front wall having two apertures spaced to register with the two rear wheels;
    b. means for mounting said housing at a preselected location separate from said motorized chair;
    c. a shaft spanning the two rear wheels and being mounted on said housing for rotation between a first angular position and a second angular position;
    d. a pair of wheel-engaging plates mounted on said shaft in register with said two apertures and movable with said shaft between said first position in which said plates are spaced from the respective registering wheels and said second position in which the plates are in engagement with the respective registering wheels; and,
    e. actuating means mounted on said housing for moving said shaft and said arcuate plates between said first position and said second position.

2. Clamp lock as in claim 1 in which said actuating means includes a lever interconnected at its lower end to said shaft and extending upwardly to an upper end within the convenient reach of the chair occupant.

3. Clamp lock as in claim 2 in which said housing includes a top wall and in which said lever extends through an opening in said top wall, the walls of said opening providing a fulcrum and making said lever a lever of the first class so that movement of said upper end of said lever in a forward direction is accompanied by movement of said lower end of said lever in a rearward direction, and vice versa.

4. Clamp lock as in claim 3 in which the distance from said upper end of said lever to the fulcrum is on the order of three to four times the distance from the fulcrum to said lower end of said lever to enhance the leverage available to the occupant in clamping said wheel-engaging plates on the rear wheels of the chair.

5. Clamp lock as in claim 2 in which said actuating means further includes a fulcrum member on said housing engaging said lever intermediate said ends thereof for reversing the fore and aft movement of said upper end of said lever; a base block mounted on the bottom of said housing; an upper link mounted at its upper end on said shaft; a lower link pivotally mounted on said base block; a middle link pivotally mounted at its upper end on the lower end of said upper link and at its lower end on the upper end of said lower link; and means for pivotally mounting said lower end of said lever on the axis of the pivotal connecton of said middle link and said lower link, said links providing an overcenter linkage as said upper end of said lever is moved in said forward and rearward directions.

6. A clamp lock as in claim 5 in which forward movement of said upper end of said lever is accompanied by rearward movement of said lower end of said lever, rearward movement of the pivotal connection of said middle link and said lower link, upward movement of the pivotal connection of said middle link and said upper link, and downward movement of said wheel-engaging plates.

7. A clamp lock as in claim 5 in which rearward movement of said upper end of said lever is accompanied by forward movement of said lower end of said lever, forward movement of the pivotal connection of said middle link and said lower link, downward movement of the pivotal connection of said middle link and said upper link, and upward movement of said wheel-engaging plates.

8. A clamp lock as in claim 1 further including a fixed vertical pin, and means for pivotally mounting said housing on said pin to enable said housing to rotate about a vertical axis as the motorized chair is backed toward said housing and one of the rear wheels enters the respective one of said apertures prior to the entry of the other of the rear wheels into the other of said apertures.

* * * * *